(12) United States Patent
Wang et al.

(10) Patent No.: US 11,522,625 B1
(45) Date of Patent: Dec. 6, 2022

(54) PREDICTING REGIONAL VIEWERSHIP FOR BROADCAST MEDIA EVENTS

(71) Applicant: PREDICT HQ LIMITED, Auckland (NZ)

(72) Inventors: Xuxu Wang, Auckland (NZ); Yu Tian, Auckland (NZ)

(73) Assignee: PREDICT HQ LIMITED, San Francisco, CA (US)

( * ) Notice: Subject to any disclaimer, the term of this patent is extended or adjusted under 35 U.S.C. 154(b) by 0 days.

(21) Appl. No.: 17/704,566

(22) Filed: Mar. 25, 2022

Related U.S. Application Data

(60) Provisional application No. 63/192,698, filed on May 25, 2021.

(51) Int. Cl.
| | | |
|---|---|---|
| *H04H 60/45* | (2008.01) |
| *H04N 21/24* | (2011.01) |
| *H04H 60/64* | (2008.01) |
| *H04N 21/258* | (2011.01) |
| *H04H 60/66* | (2008.01) |

(52) U.S. Cl.
CPC ............ *H04H 60/45* (2013.01); *H04H 60/64* (2013.01); *H04H 60/66* (2013.01); *H04N 21/2407* (2013.01); *H04N 21/2408* (2013.01); *H04N 21/25841* (2013.01); *H04N 21/25883* (2013.01)

(58) Field of Classification Search
CPC .......... H04N 21/2407; H04N 21/2408; H04N 21/25841; H04N 21/25883; H04H 60/45; H04H 60/64; H04H 60/66
See application file for complete search history.

(56) References Cited

U.S. PATENT DOCUMENTS

| | | | |
|---|---|---|---|
| 10,708,654 B1 * | 7/2020 | Moraghan | .......... H04N 21/2547 |
| 2019/0005513 A1 * | 1/2019 | Bennett | .................. H04H 60/33 |
| 2019/0066170 A1 | 2/2019 | Schnoor | |
| 2021/0281925 A1 * | 9/2021 | Shaikh | ............... G06Q 30/0243 |

OTHER PUBLICATIONS

The International Searching Authority, "Search Report" in Application No. PCT/US2022/030929, dated Sep. 14, 2022, 11 pages.
Current Claims in Application No. PCT/US2022/030929, dated Sep. 2022, 3 pages.

* cited by examiner

*Primary Examiner* — Yassin Alata
(74) *Attorney, Agent, or Firm* — Hickman Becker Bingham Ledesma

(57) ABSTRACT

Techniques for regional viewership predictions of broadcast events such as live broadcast professional sporting events. The techniques can make the predictions without a direct response variable such as regional viewership data for training a prediction model. Instead, in one technique, demand information for a good or service is used. From the demand information, a derivative demand for the good or service relative to a normal demand is determined. A regression framework is used to learn relationships between the derivative demand for the good or service and features of past live broadcast sporting events. This results in a matrix of feature weights. A non-parametric mixture framework is then used to find a set of feature weights that can be applied to features of future broadcast events to generate regional viewership predictions for the events.

20 Claims, 7 Drawing Sheets

PREDICTING REGIONAL VIEWERSHIP FOR BROADCAST MEDIA EVENTS

CROSS-REFERENCE TO RELATED APPLICATIONS, BENEFIT CLAIM

This application claims the benefit of Provisional Application 63/192,698, filed May 25, 2021, the entire contents of which is hereby incorporated by reference as if fully set forth herein, under 35 U.S.C. § 119(e).

TECHNICAL FIELD

The present disclosure relates to machine learning. More specifically, the present disclosure relates to machine learning techniques for predicting viewership in individual geographic regions for broadcast media events, where the techniques overcome the lack of direct response variables that can be used to conventionally learn a prediction model.

BACKGROUND

The accuracy of predictions made with respect to broadcast event viewership can affect how useful those predictions are. Consider an example of a food delivery service that wants to know how busy they will be making food deliveries in certain geographic regions during certain live broadcasts of professional sporting events. The provider of a prediction service that makes regional viewership predictions for broadcast media events may want to offer the prediction service to the food delivery service for a subscription fee. The accuracy of the predictions made by the prediction service can be critically important to the value of the prediction service to the food delivery service. For example, if the predictions made by the prediction service are often inaccurate, then the food delivery service cannot reliably use the predictions for resource allocation such as predetermining the number of food delivery drivers and the amount of food inventory that will be needed in a region because of a given live broadcast sporting event.

Techniques described herein address these issues.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The techniques are illustrated by way of example, and not by way of limitation, in the figures of the accompanying drawings and in which like reference numerals refers to similar elements and in which.

DETAILED DESCRIPTION

Figure 1:
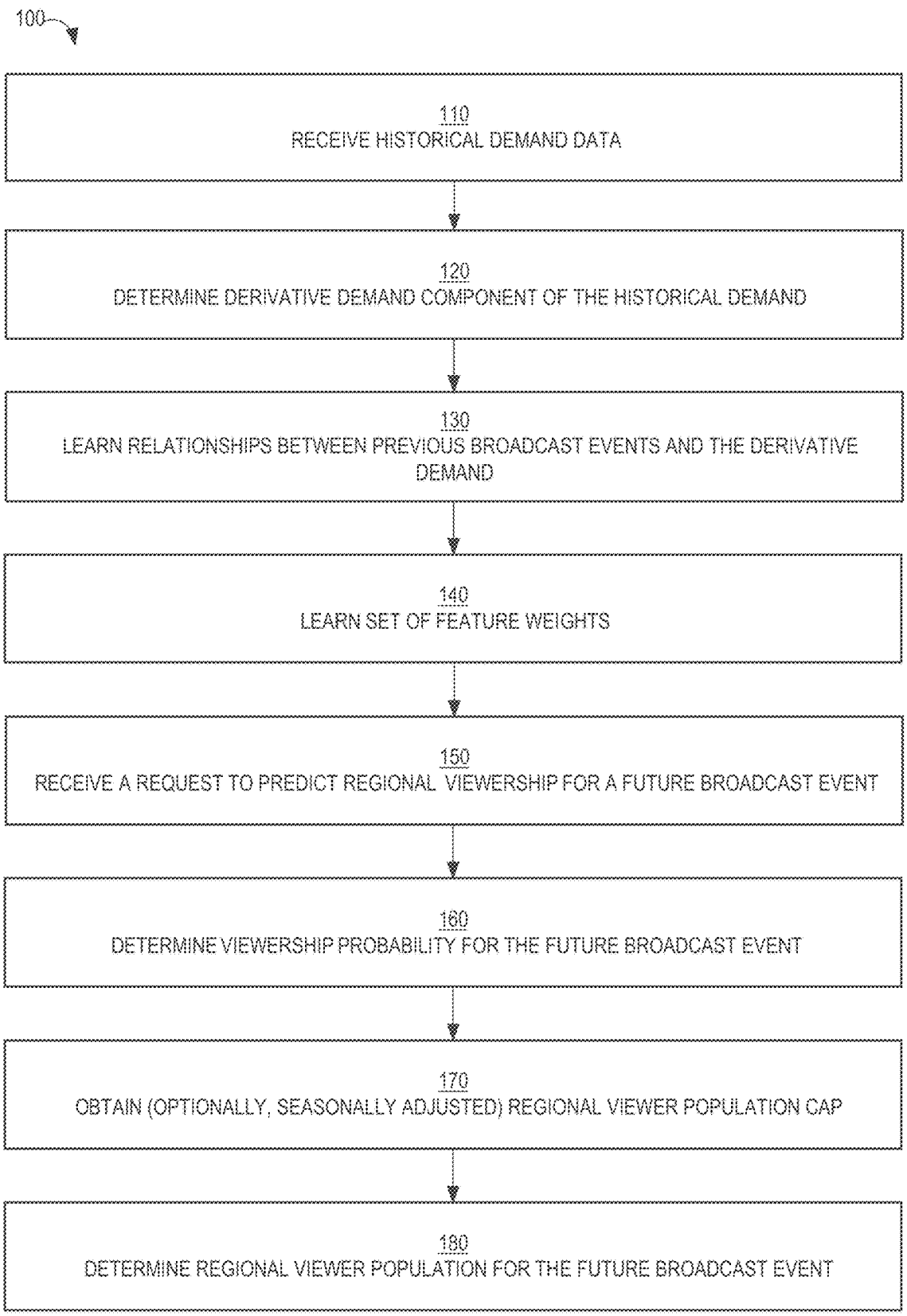
FIG. 1 is a flowchart of a process for predicting regional viewership for broadcast media events, in an embodiment.

In the following description, for the purposes of explanation, numerous specific details are set forth to provide a thorough understanding of the techniques. It will be apparent, however, that the techniques may be practiced without these specific details. In other instances, well-known structures and devices are shown in block diagram form to avoid unnecessarily obscuring the techniques.

General Overview

The accuracy of regional viewership predictions for broadcast media events can be vitally important to the success of those predictions. Unfortunately, historical viewership information at the regional level for past broadcast media events is generally not available. So, the ability to learn a model for regional viewership prediction that does not rely on the existence of such response variables is needed. Along with the need for an unconventional machine learning approach, there is a need for accurate predictions.

In an embodiment, a non-supervised learning approach is implemented to estimate viewership of a future broadcast event for a particular region, such as at a county level. Such an approach involves three main components: (1) estimating a population cap (or fanbase) for the particular region; (2) deriving a season round function that outputs a value (based on the point in a season) that scales the estimated regional population cap; and (3) a non-parametric probability framework that comprises features (and their corresponding weights) of futures broadcast events and that produces a probability estimate that people in the population cap will view a particular future broadcast event in the particular region. Thus, different regions may have different estimated population caps. The same probability framework may be used to generate a different probability estimate for each of multiple different regions. In a related embodiment, in the context of sports, a different season round function may be derived for different types of sports or different sports leagues, such as NFL, NBA, MLB, and MLS. Similarly, in the context of sports, different probability frameworks (and their respective weights) are generated for different sports leagues.

In an embodiment pertaining to a non-parametric probability framework, techniques herein balance the need for an unconventional learning approach with the need for accuracy, using information about (a) national viewership or (b) the demand for goods and services for past broadcast media events to learn relationships therebetween. For a given future broadcast media event, weighted features of the event are summed to generate a viewership probability and the viewership probability is multiplied by a regional viewer population cap to estimate a regional viewer population for the event. The numerical feature weights may be determined in two steps. First, relationships between historical broadcast media events and (a) national viewership or (b) the derivative regional demand for goods and services during the events are learned according to a regression framework. Second, the numerical feature weights are learned from the learned relationships according to non-parametric mixture framework.

As an example of the problem addressed by the techniques herein, consider a food delivery service such as a pizza chain that delivers fresh baked pizza on demand to customers in different regions (e.g., different United States cities, counties, or zip code areas). In operation, for any given time period, the pizza chain would benefit from knowing how much food inventory, how many food preparers, and how many delivery drivers it will need to service demand for pizza in different regions during the time period. Having too many resources provisioned is wasteful. Having too few can cause customer dissatisfaction or unfulfilled orders. It can be difficult for the pizza chain to predict the resources it will need for all regions where it has franchises consistently and accurately. Thus, in allocating resources, the pizza chain may easily over-allocate and under-allocate resources at different times and in different regions. As such, accurately predicting external factors such as regional (local) television viewership of live broadcast sporting events that affect demand for pizza in a particular region is very important. The accurate regional viewership prediction is not only important for the pizza chain who will be able to better allocate resources to meet expected demand in a particular region during the broadcast events, but also to the online prediction service that relies on the revenue from subscriptions to their service. If such a prediction is inaccurate, then the pizza chain might question the value of the prediction service and resort to their previous way of estimating regional demand for live broadcast events.

The techniques provide for regional viewership predictions of broadcast events such as live broadcast professional sporting events. Further, as alluded to above, the techniques can make the predictions without direct response variables such as regional viewership data for training a prediction model. Instead, national viewership data or demand information for a good or service is used. From the national viewership or demand information, a derivative demand for the good or service relative to a normal demand is determined. A regression framework is used to learn relationships between the derivative demand for the good or service and features of past live broadcast sporting events. This results in sets of mixture component weights, which may be represented in computer storage media as a matrix of numerical values. A non-parametric mixture framework is then used to find a set of mixture weights that can be applied to features of future broadcast events to generate regional viewership predictions for the events.

The techniques herein use non-parametric mixture model approach in which a discrete mixing distribution is estimated non-parametrically. Here, the discrete mixing distribution is estimated non-parametrically from sets of learned "mixture component" weights reflecting relationships between derivative demand (e.g., unusual incremental or decremental demand) for the good or service and features of past broadcast events when that derivative demand occurred. The sets of mixture component weights are learned using a regression framework where features of past broadcast events are input to the framework and derivative goods and services demand data is used as the response variable for the regression to learn the sets of mixture component weights. The non-parametric mixture model approach is then applied to the sets of mixture component weights to learn a final set of mixture weights that can be applied to features of future broadcast events for which a regional viewership prediction is desired.

The techniques proceed by receiving derivative demand data for many previous broadcast events (e.g., derivative demand for pizza during live professional football television broadcasts). For example, thousands of live professional football game broadcasts may occur over multiple seasons and demand data for a good or service (e.g., pizza deliveries) for all of those broadcasts may be processed at one time to determine the derivative demand for the good or service when the games were being broadcasted. As used herein, the term "derivative demand" is intended to encompass both incremental demand and decremental demand for a good or service. If the normal demand for the good or service is plotted over time as a demand curve, incremental demand occurs when there is an upward shift in demand for the good or service relative to the normal demand curve. Decremental demand for the good of service occurs when there is a downward shift in demand for the good or service relative to the normal demand curve.

Using the derivative demand data as the response variable and features of the game broadcasts as input to the regression framework, relationships in the form of sets of mixture component weights can be learned. The non-parametric mixture framework is then applied to the sets of mixture component weights (e.g., as a matrix) to learn a set of mixture weights by estimating a discrete mixing distribution non-parametrically. For an upcoming remaining game in a current season, the mixture weights are applied to features of the upcoming broadcast to determine a viewership probability for the broadcast. That probability is multiplied by a predetermined regional viewership population cap for a particular region to obtain a regional viewership population for the upcoming broadcast. In some instances, the regional viewership population cap is seasonally adjusted using a non-parametric mixture framework but for regression instead of density estimation. For example, regional viewership population cap may be higher if the upcoming game is a playoff or post-season game and lower if the upcoming game is a preseason game.

While examples herein are provided in the context of a broadcast of an event such as, for example, a television broadcast of a professional sport league game or match, the terms "broadcast event" and "broadcast media event" are intended to encompass either a television broadcast or an Internet broadcast or other type of media broadcast of an event that is scheduled to occur at a particular time. Further, while examples are given in the context of sporting events, the techniques can be used for other type of broadcast events such as for example an awards show, a political debate, or an initial airing of an episode of an episodic television or Internet series such as a season premiere episode or a season final episode.

Example Process for Predicting Regional Viewership for Broadcast Media Events

FIG. 1 illustrates a process 100 for predicting regional viewership for a broadcast media event, in an embodiment. In this embodiment, the process proceeds by receiving historical demand data 110 for a good or service and determining the derivative demand 120 for the good or service. Relationships between the derivative (e.g., incremental) demand and previous broadcast events within the historical demand data are learned 130 according to a regression framework. In another embodiment, national viewership data is received and analyzed instead of historical demand data. National viewership data is useful when historical demand data is not available. Then, relationships between derivative national viewership and previous broadcast events are learned according to a regression framework.

A set of mixture weights are then learned 140 based on the relationships learned and according to a non-parametric mixture probability framework. In response to receiving 150 a request for a prediction for a future broadcast event and a region, a determination 160 of the viewership probability for the future event is made along with obtaining 170 a viewer population cap for the region, which is optionally seasonally adjusted. The regional viewer population for the future event is then determined 180. In some instances, operations 150, 160, 170, and 180 are repeated for other future events or other regions. In a related embodiment, operation 150 is not needed. Instead, a prediction for a future broadcast event may be calculated automatically without waiting for a user or customer to explicitly request the prediction. In other words, the prediction (and, potentially, many predictions for many known future broadcast events) may be calculated in advance prior to any specific requests for those predictions from any user customers/requesters.

As an example, consider a nationwide pizza chain with franchises located across the United States. Television broadcasts of two professional football league playoff games may be scheduled to take place on an upcoming Saturday. One of the games may be between a team from Las Vegas and a team from Indianapolis. The other playoff game may be between teams from Green Bay and Dallas. The pizza chain may wish to predict the viewership of each game in all regions (e.g., counties) across the United States where it has franchises. By doing so, the pizza chain can alert individual franchises if they are predicted to have significant derivative viewership (e.g., significantly above or below a normal demand) in their region for one or both the games. The franchise can then staff and allocate resources accordingly. The system depicted in FIG. 5 or the hardware depicted in FIG. 6 and the software depicted in FIG. 7 may be used to implemented process 100 and other techniques herein.

As another example, consider an online driver for hire service where users can use a mobile phone application to request a driver to pick them at a current physical location and drive them to a specified physical location. The online service may also wish to know the predicted regional viewership population for the two playoff games so that they can alert the fleet of drivers in regions where demand for driving services is expected to be greater than usual (e.g., by viewers needing a ride home from bars and restaurants) or lower than might be expected for a playoff game, for example, because viewers in the region are not interested in either of the two teams playing each other or because of competing events (e.g., concerts or festivals) in the region.

In many of the examples herein, the regions for which a regional viewership prediction is made are United States counties. However, as used herein, a "region" can be any subdivision of an area of land. The subdivision can be an administrative or political subdivision. In the United States, for example, a region may be or may correspond to a county, a federal congressional district, a zip code, a phone area code, a city, etc. Alternatively, the subdivision can be a geometric such as, for example, the area within a radial distance from a given geographic location such as, for example, the location of a provider of a good or service (e.g., a pizza delivery franchise).

Returning to the top of process 100, historical demand data for a good or service is received 110. Receiving data may take any appropriate form. In some embodiments, data may be received from another system, may be received from another process, function, etc. within the same system, may be received in a shared memory space, such as a database, directory, etc. For example, a pizza chain may provide unstructured event data or transactional data reflecting the number of orders (e.g., number of pizzas delivered) by its franchises over time. The demand data may be stored in attached storage for later processing, cloud storage 540 or 541, at storage local to receiving system 510, 520, or 530, or in any other appropriate location.

Demand data received may be converted to time series data or received as time series data. Values missing from received demand data may be automatically imputed by a computing process when constructing a time series of the demand data. The computing process may also check the quality of the time series data using stationary attributes and rolling standard deviation computations. The time series data may be decomposed using nonparametric machine learning to automatically detect normal weekly and monthly cyclicities, seasonal patterns, and long-term and short-term trends in the demand for the good or service. These identified patterns can be input to a computing process that automatically detects derivative anomalies in the demand data based on reconstructed demand patterns.

False-positive detection may also be performed. In particular, a false positive detection algorithm may be used to detect positive anomalies which are not generated by certain events and then adjust the derivative demand estimation. A computed false discovery rate may be used to calculate the strength level of the derivative demand. Determined derivative demands may be automatically categorized into strong, medium, weak, and no impacts. The detected derivative demands may be joined with previous broadcast event impacts as well as holiday events counts to correlate the time series transaction data with the previous broadcast events.

As an example of the operations and of process 100, consider a pizza chain franchise in St. Louis, Mo., U.S.A. The franchise operation may have noticed an increase in demand for pizza orders during televised professional football games. Operations of process 100 may be performed on historical demand data provided by the franchise to understand which football games have an impact on demand. For example, operations of process 100 may be performed to model a subset of historical transaction demand data for 2019 provided by the franchise and remove seasonal patterns and normal trends to identify an increase in demand correlation with professional football game broadcasts.

The historical transaction demand data may be provided by the franchise as time series data. For example, the following represents a possible snippet of such a time series where each time series item specifies a date and the number of pizzas ordered from the franchise on that date:

| Date | Demand |
| --- | --- |
| 2020 Nov. 19 | 377 |
| 2020 Nov. 20 | 299 |
| 2020 Nov. 21 | 317 |
| 2020 Nov. 22 | 488 |
| 2020 Nov. 23 | 400 |

Operations of process 100 may involve analyzing the properties of the time series demand data and applying decomposition to break down the time series demand data into different underlying time-series components. Each component may represent specific patterns such as trend, cycle, and seasonality. By doing so, identification of residual values that cannot be explained by these components can be identified. For example, the residual values may be explained by external factors such as broadcast media events.

Figure 2:
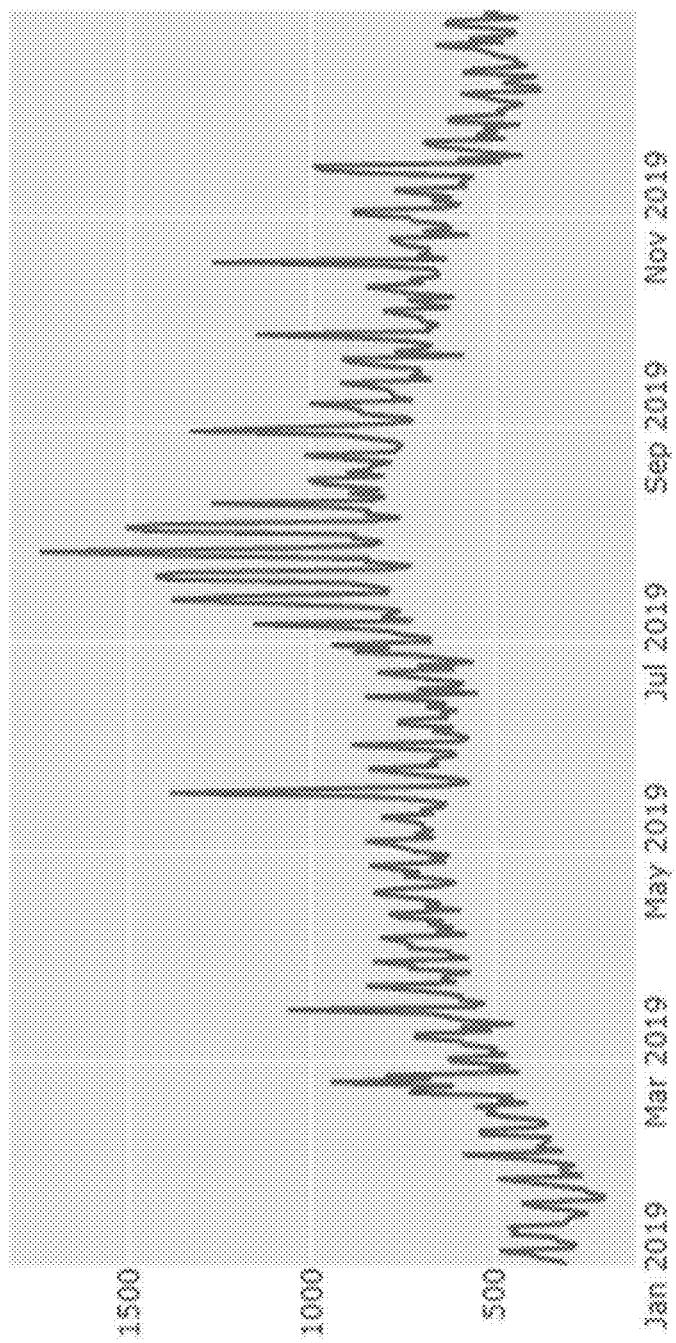
FIG. 2 is a graph of time series demand data.

FIG. 2 is a graph of time series demand data from which trend, cycle, seasonality, and residual time series components can be derived. The horizontal (x) axis represents time, and the vertical (y) axis represents demand over that time.

For example, the above example historical transaction demand data may be decomposed into seasonal, trend, and irregular components using a STL procedure that is based on local-weighted regression:

| Date | Demand | Seasonal | Trend | Remainder |
|---|---|---|---|---|
| 2020 Nov. 19 | 377 | 69 | 269 | 39 |
| 2020 Nov. 20 | 299 | 1 | 286 | 12 |
| 2020 Nov. 21 | 317 | 29 | 278 | 10 |
| 2020 Nov. 22 | 488 | 288 | 260 | −60 |
| 2020 Nov. 23 | 400 | 175 | 264 | −39 |

One example of a possible STL procedure that is based on local-weighted regression is described in the following paper: R. B. Cleveland, W. S. Cleveland, J. E. McRae, and I. Terpenning (1990) STL: A Seasonal-Trend Decomposition Procedure Based on Loess. *Journal of Official Statistics*, 6, 3-73. However, no particular STL procedure for decomposing demand time series data into seasonal, trend, and remainder time series components is required.

Figure 3:
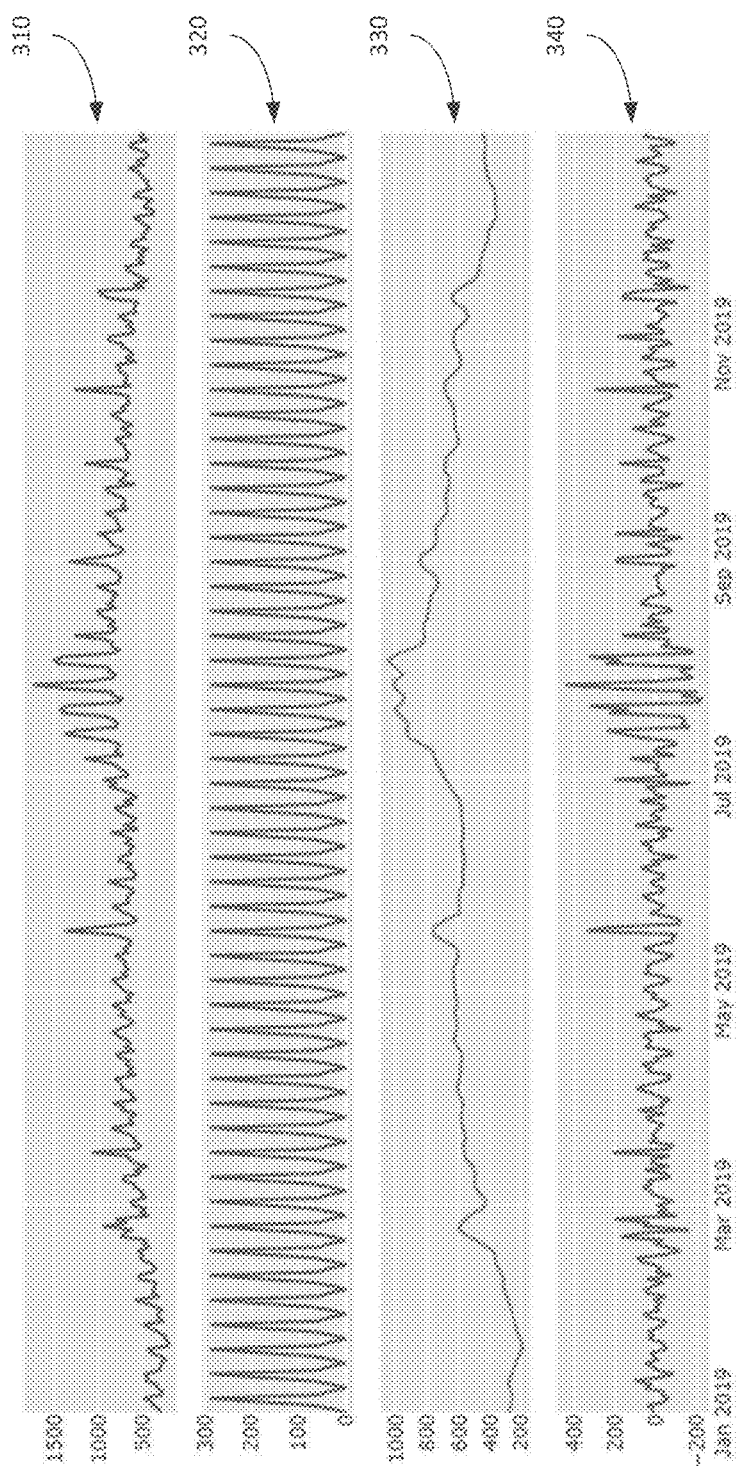
FIG. 3 includes graphs of trend, seasonality, and remainder components of the demand data graphed in FIG. 2.

FIG. 3 includes graphs of the seasonal, trend, and remainder time series decomposed from the demand data graphed in FIG. 2. Graph 310 plots the demand data. Graph 320 plots the seasonal time series data component. Graph 330 plots the trend time series data component. Graph 340 plots the remainder time series data component.

A time series decomposition process such as STL based on local-weighted regression can be used to extract seasonal and trend components in demand data. The remainder component can be determined based on what is remaining of the demand data after removing both the seasonal and trend components. Further processing may be performed to determine the derivative demand 120 from the demand data. For example, it may be observed that the trend graph 330 contains extra demand signals. These signals can be extracted using trend smoothing techniques. For example, a moving average may be applied to the trend component using a relatively large window size to smooth the trend. The smoothed trend may then be subtracted from the original trend component to obtain an adjusted trend component. Next, negative values may be removed from the remainder and adjusted trend components by clipping them to zero. Finally, the derivative demand can be computed by adding the clipped residuals and the clipped adjusted trend components.

Figure 4:
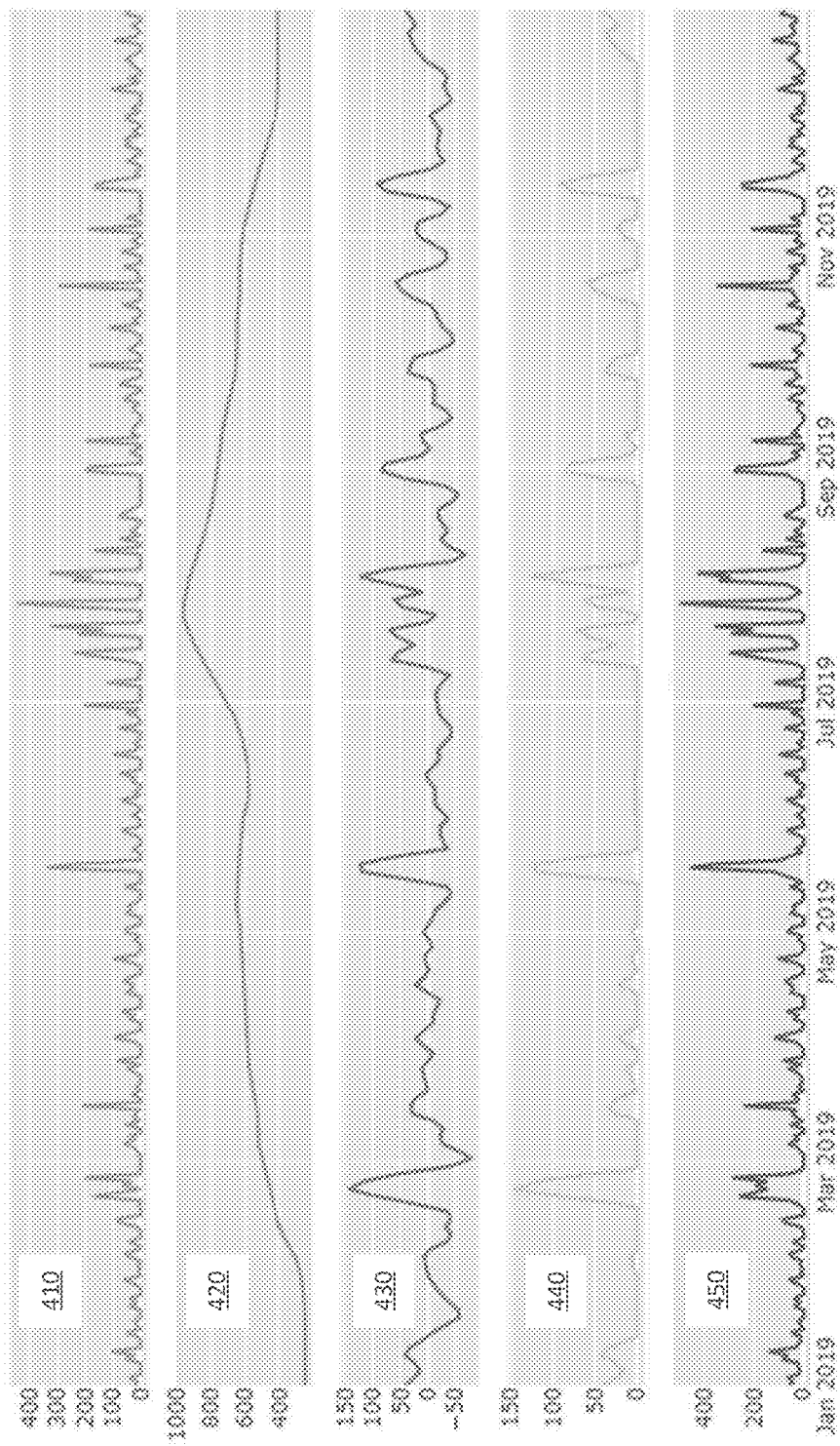
FIG. 4 includes a graph of derivative demand derived from the demand data graphed in FIG. 2 and the trend, seasonality, and remainder components graphed in FIG. 3.

FIG. 4 includes graph 410 of the remainder component 340 of FIG. 3 after clipping at zero, graph 420 of the trend component 330 of FIG. 3 after smoothing, graph 430 reflecting the result of subtracting the smoothed trend 420 from the original trend 330 of FIG. 3, graph 440 of the adjusted trend component 430 after clipping at zero, and graph 450 of the derivative demand reflecting the result of adding the clipped reminder 410 and the clipped adjusted trend component 440.

Time-based correlations between the dates and times of previous broadcast events and historical derivative demand covering a time period of the events may be determined. For example, if there is high derivative demand during or around the time that a broadcast event occurred, then it may be determined there is a correlation between the broadcast event and the derivative demand. If the derivative demand data is regionalized, then only broadcast events that were viewable in the region may be considered. For example, if the derivative demand data is for the St. Louis metropolitan region, then only broadcast events that were viewable in the St. Louis region may be considered for correlation with the derivative demand data. In any case, with the derivative demand data it can be determined for any given historical broadcast event viewable in the region to which the derivative demand data pertains, what the derivative demand was in the region during and for the broadcast event.

In some embodiments, the historical derivative demand during a historical broadcast event is represented by numerical values greater than or equal to zero where zero means no derivative demand and a positive number greater than zero reflect the extent of the derivative demand for the event. For example, the numerical value can be the absolute derivative demand at the peak derivative demand during the event.

A machine learning regression model is used to learn relationships between features of previous broadcast events in a region and the derivative demand for the good or service as well as any publicly available historical viewership in the region for those events. The relationships learned are in the form of mixture component weights for the event features, one mixture component weight per feature of the set of features. A set of mixture component weights may be learned for each previous broadcast event. For example, a set of mixture component weights may be learned for each televised broadcast of a game of a particular sports league in the region.

In some embodiments, all the features of a media broadcast of a live sporting event are used, a subset of these features, or a superset thereof:

| Feature Name | Comment |
|---|---|
| Time of the season | A numerical value between zero and one indicating how far into the season the game takes place. For example, a value closer to one may represent a post-season game and value closer to zero may represent a pre-season game and value in between may represent a regular season game. |
| Team performance maximum | A numerical value between zero and one indicating the performance of the better performing team participating in the game among all teams in the league. For example, the value may reflect the win-loss ranking among all teams in the league of the team with the better win-loss percentage of the two teams participating in the game. |
| Team performance minimum | A numerical value between zero and one indicating the performance of the worse performance team participating in the game among all teams in the league. For example, the value may reflect the win-loss ranking among all teams in the league of the team with the worse win-loss percentage of the two teams participating in the game. |
| Home Team performance | A numerical value between zero and one indicating the performance of the home team among all teams in the league, if there is a home team. A "home team" may be defined as the team that is within a certain distance of the center of a broadcast region, such as 120 kilometers. Alternatively, a home team may be defined as the team that is in the same state as the broadcast region. |

-continued

| Feature Name | Comment |
| --- | --- |
| Distance between Team Location and Broadcast Region | A numerical value between 0 and 1 indicating the physical distance between a team location and the broadcast region. A value closer to 1 indicates a closer distance and a value closer to zero indicates a greater distance. Alternatively, the numerical value is 1 if at least one team's location is within, for example, 120 kilometers of the center of the broadcast region; 0 otherwise. |
| Weekend in broadcast region | A numerical value that is either 0 or 1 indicating whether the live broadcast occurs during a weekend in the region. |
| Distance between game location and region | A numerical value between 0 and 1 indicating the physical distance between the game location and the broadcast region. A value closer to 1 indicates a closer distance and a value closer to zero indicates a greater distance. |
| Local broadcast time in region | A numerical value between 0 and 1 indicating the time of day in the broadcast region when the game is broadcast in the region. For example, a value just above 0 may represent a time just after midnight, 0.5 may represent Noon, and a value just before 1 may represent a time just before midnight of the next day. |
| Inter-league competition from another sports league. | A numerical value between 0 and 1 representing the extent of competition for viewers between the league of the game in question (e.g., the National Football League ™) and another league for which a game or match is being broadcast in the region at the same time (e.g., the National Basketball Association ™). A value closer to 1 represents that the two leagues generally compete for the same viewers while a value closer to 0 represents that the two leagues generally do not compete for the same viewers. The value may be zero if there are no games from the other sports league being broadcast in the region at the same time. The feature set for a broadcast may have multiple inter-league competition features for multiple other sports leagues. This feature may be multiple features, one for each other sports league. For example, in attempting to predict the viewership of an NFL game, there may be three inter-league competition features, one for NBA, one for MLB, and one for MLS. |
| Intra-league competition from same sports league. | A numerical value between 0 and 1 represents the extent of competition for viewers between two games from the sport league that are broadcast into the region simultaneously on different television channels. A value closer to 1 represents more games broadcast at the same time in the region. A value closer to 0 represents fewer games broadcast at the same time in the region. |
| Game Frequency | A numerical value between 0 and 1 representing how often games from the league are broadcast in the region which will vary depending on the league schedule. A value closer to 1 represents that league games are often broadcast in the region such as, for example, Major League Baseball ™ games. A value closer to 0 represents that league games are less often broadcast in the region such as, for example, National Football League ™ games. |
| Popularity of Team Max | A numerical value between 0 and 1 representing the popularity of the most popular team participating in the game. The popularity may be based on nationwide popularity. For example, the Dallas Cowboys of the National Football League ™ may have a value closer to 1 than the Cincinnati Bengals. |
| Uncertainty of Game | A numerical value between 0 and 1 represents how uncertain is the outcome of the game such as, for example, reflecting by a betting line or betting odds. A value closer to 1 may reflect that the outcome is very uncertain as the teams are evenly matched while a value closer to 0 may reflect that one team is a heavy favorite to win. |

At operation 140, a non-parametric mixture model framework is applied to the sets of mixture component weights learned to learn a set of mixture weights that reflect the distribution of the sets of mixture component weights learned. By using a non-parametric mixture model, no assumption needs to be made about the distribution of the sets of mixture component weights learned. For example, it need not be assumed that the sets of mixture component weights have a linear, quadratic, Gaussian, exponential, or other distribution. Furthermore, determining weights by component feature independently allows for more flexibility.

In some embodiments, over time, operations of process 100 may be repeated as new demand data is provided and new broadcast events occur, each time a new set of feature weights will be learned 140.

Receiving 150 the request for a prediction may include receiving an indication that a prediction is needed. In some embodiments, the request for a prediction may be received 150 along with context that defines important information about the request. For example, in the pizza chain example, the context received may include an identifier of a pizza chain or a user identifier associated with the pizza chain, an identifier of the future broadcast event for which the prediction is desired, and an identifier of a region for which the prediction is desired.

Requests may be received 150 from or on behalf of applications that are being used by users, from or on behalf of web pages that are being accessed by the user, from or on behalf of an online prediction system (e.g., from or on behalf of a system that makes regional viewership predictions), and the like. For example, requests for predictions may be received 150 from a system such as prediction request system 530 of FIG. 5 on behalf of a user using an application, or on behalf of a system that has determined that a user will consume the prediction.

In an embodiment, a request is not required to trigger the computation of predicting viewership of a broadcast event for a particular region. Instead, a computer system generates a predicted viewership for each of one or more regions for one or more broadcast events. For example, two days before a particular sporting contest that will be broadcast, multiple regions are identified in which people will be able to view the broadcast. A predicted viewership of each identified region is computed and stored in persistent storage for later retrieval or later transmission. For example, one or more vendors with presence in one or more of the identified regions automatically receive (e.g., via electronic messages over a computer network) such predicted viewership information pertaining to those respective regions.

Viewership Probability

At operation 160, the viewership probability for the future broadcast event is determined. In some embodiments, the viewership probability is determined by summing the value of each feature for the future broadcast event by the corresponding mixture weight learned at a previous performance of operation 140 as in the following equation:

$$V(x; G, B) = \left(\sum_{j=1}^{m} \pi_j \times f(x; \theta_j)\right) \times S(x; B) \text{ where } \pi_j > 0 \text{ for } j = 1, \ldots m, \sum_{j=1}^{m} \pi_j = 1$$

In the above equation, V (x; G, B) represents a viewership probability for the future broadcast event. It is computed as the sum of each weighted feature value $\pi_j \times \theta_j$ for the future broadcast event where the weight $\pi_j$ for a feature $\theta_j$ is learned according to the non-parametric mixture approach at a previous performance of operation 140. S(x; B) represents the estimated sports fan cap value for a given sport league and season round. The features of the future broadcast event used can be the same as those used for historical broadcast events when learning 130 the relationships between the historical broadcast events and the historical derivative demand. For example, if the broadcast event is a broadcast of a sporting event, then all of the features discussed above can be used, or a subset of those features, or a superset thereof.

It should be noted that the demand data from which the relationships are learned 130 and the set of features weights are learned 140 can be regional. That is, the demand data reflects demand for a good or service in a particular region such as a United States county, city, or zip code area or at a particular store or retail location where a good or service is provided. For example, the demand data may be based on transactional sales in the particular region. In this case, the set of feature weights learned 140 are for that particular region and a viewership probability computed thereon is also for that particular region, store, or retail location. Process 100 may be repeated for each different region using demand data from that region.

Regional Population Viewer Cap

At operation 170, a regional population viewer cap (or "fan base") for the target region is obtained. The regional population viewer cap represents an estimated maximum number of persons in the target region that might view the future event. The regional population viewer cap may be calculated in various ways. In one way, an estimated total nationwide viewership cap for the future event is predicted and the prediction value is distributed over regions of the nation (e.g., counties of the United States) according to a probability model. For example, a supervised learning approach may be used to predict a nationwide viewership cap of the future event based on training examples that incorporate the actual nationwide viewership for previous broadcast events. The actual nationwide viewership values incorporated may be provided by a viewership tracking service such as Nielson™ or the like. The probability model for distributing the predicted nationwide cap for the future event to different regions may be based on various information about each region such as, for example, the number of persons that reside in the region, the number of television sets in the region, the number of Internet service provider subscriptions in the region, the demographics of the persons that reside in the region, the type of the future event, etc.

In another way, a regional population viewer cap is computed for a region based on external data sources, such as population statistics for the region and online (e.g., Internet) searches of identities of entities (e.g., people, groups, leagues, or parties) involved in a broadcast media event. Online searches for an entity reflect interest in that entity. For example, the greater the number of searches from a particular region with "NFL" as a search term, the greater the regional population viewer cap for that region for the NFL league. As another example, the greater the number of searches from a particular region with "LA Rams" as a search term, the greater the regional population viewer cap for that region for the NFL league. In the context of sports leagues, online searches for individual teams may be attributed to the corresponding sports league.

In the context of sports, the same region may be associated with multiple regional population viewer caps, one for each sports league or sports type. For example, a region may be associated with a first population viewer cap for football and a second population viewer cap for basketball, where the first population viewer cap is greater or lesser than the second population viewer cap.

In an embodiment, a regional population viewer cap for a region changes from one time period to another, such as month to month, quarter to quarter, or year to year. Thus, such a viewer cap may be recalculated regularly to ensure that the viewer cap is as accurate as possible. Therefore, for two media events that have the same regional viewership probability at different times within a year, if the regional population viewer cap is greater at one of those times, then the estimated viewership is greater at that time than at the other time.

Seasonally Adjusted Viewer Cap

In some embodiments, the regional population viewer cap computed 170 for the target region is seasonally adjusted; that is, adjusted for the time of year or the time in the sports league season when the future broadcast event takes place. The regional population viewer cap is adjusted using a season round function that represents a relationship between the numbers of viewers in a region and the time in a season of a broadcast event. Here, there may not be a linear, quadratic, exponential, or Gaussian relationship between the number of viewers in a region and the season of a broadcast event. For example, at least in the sports event context, the relationship may have several plateaus where each plateau roughly corresponds to a different number of seasonal viewers. For example, pre-season games might be a first plateau of viewers, then the number of viewers might jump (increase) to a second plateau of viewers for regular season games, then jump again to a third plateau of viewers for post-season games, and possibly jump again to a fourth plateau of viewers for the championship game (e.g., the Super Bowl of the National Football League™).

Accordingly, in some embodiments, a non-parametric mixture approach in a regression configuration is used to predict a seasonal viewership probability for the regional population viewer cap. The seasonal viewership probability may be a probability value between 0 and 1 with a value closer to 0 meaning that the season of the future event is such that a fewer percentage of the persons in the regional population viewer cap are expected to view the future event while a value closer to 1 means that the season of the future event is such that a greater percentage of the persons in the regional population viewer cap are expected to view the future event.

Training a non-parametric mixture model as a regressor may use training examples based on previous broadcast events. Each training example for a previous broadcast event may use a time of season value between 0 and 1 and the nationwide viewership for the previous broadcast event as the response variable. The time of season value may be a numerical value between zero and one indicating how far into a particular season (e.g., a calendar year or a sport leagues season) the broadcast event takes place. A time of season value closer to one may represent a broadcast event that takes place closer to the end of the particular season and a time of season value closer to zero may represent a broadcast event that takes place closer to the beginning of the particular season. The nationwide viewership for the previous broadcast event may be obtained from a viewership tracking service such as Nielson™ or the like. Different non-parametric mixture models may be trained for different types of broadcast events. For example, separate models may be trained for each of multiple different professional sports leagues based on broadcast events and nationwide viewership data for each different league.

Once the non-parametric mixture model is trained as a regressor for predicting seasonal viewership probability, a time of season value for a future broadcast event may be input to the trained model to generate a nationwide viewership prediction for the future broadcast event. The nationwide viewership prediction for the future broadcast event may be compared to the prediction the model generates for a time of season value of 1 to determine the seasonal viewership probability for the future event. In other words, with these two values (one viewership prediction where the time of season value is based on the time of season and one viewership prediction for where the time of season value is 1, a ratio may be computed in order to determine the seasonal viewership probability for the future event.

Predicted Viewership

Overall, the predicted viewership for a future broadcast event may be computed 180 as represented by the follow equation:

$$RPV_{event} = RVP_{event} \times RVC \times SVP(\text{optional})$$

Here, $RPV_{event}$ represents the predicted number of persons that will watch a given future broadcast event in a given region. The parameter $RVP_{event}$ represents regional viewership probability for the given future broadcast event and the given region which may be computed as discussed above with respect to operation 160. The parameter RVC represents the maximum number of persons in the given region that might watch the given future broadcast event which may be computed as discussed above with respect to operation 170. The parameter SVP is an optional parameter that represents the seasonal viewership probability for the given future broadcast event which may be computed as discussed above with respect to operation 170.

Example Systems for Predicting Regional Viewership for Broadcast Media Events

Figure 5:
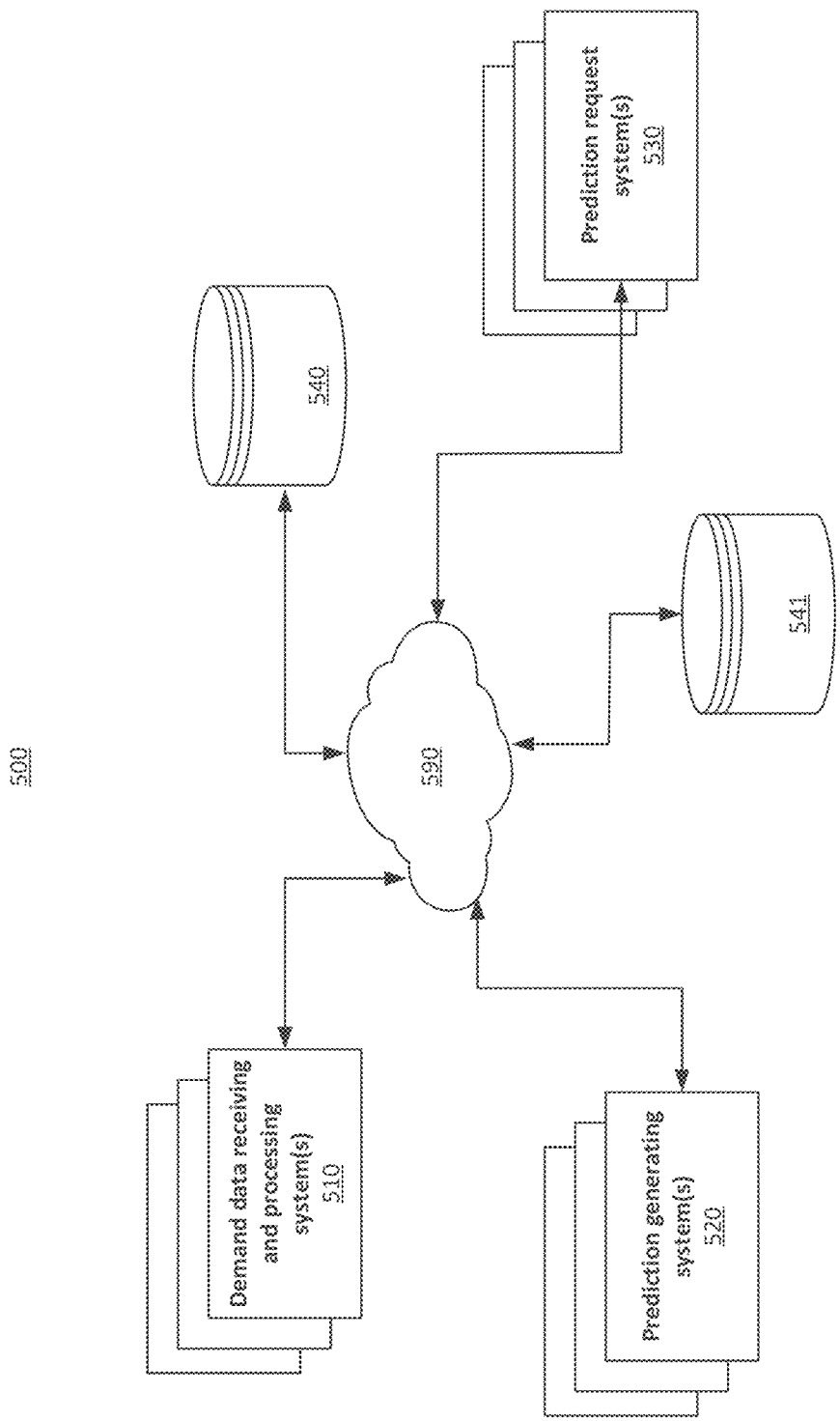
FIG. 5 depicts system for predicting regional viewership for broadcast media events.

FIG. 5 depicts an example system for predicting regional viewership for broadcast media events. The system depicted in FIG. 5 is just one embodiment of a system that may be used for predicting viewership for broadcast media events. Other simpler or more complex systems may be used. For example, the system may include several scripts or programs that run, and those scripts or programs may run on any of the depicted systems and/or on systems that are not depicted. For example, receiving and processing demand data as described herein may be performed by a demand data receiving and processing system 510, or by another system 520 or 530, or another device or system not depicted in FIG. 5. As another example, request for regional viewership predictions may be received from system 530, which may generate such request, or system 530 may act on behalf of other systems or devices (not depicted in FIG. 5) to send requests. Further, prediction generating system 520 is depicted as separate from demand data receiving and processing system 510, but the two may be, in some embodiments, the same system. Further, all systems 510-530 and storage 540-541 are depicted as separate from one another and communicatively coupled via network 590, but two or more (or all) of 510-541 may be implemented as the same system, server, or program.

Figure 6:
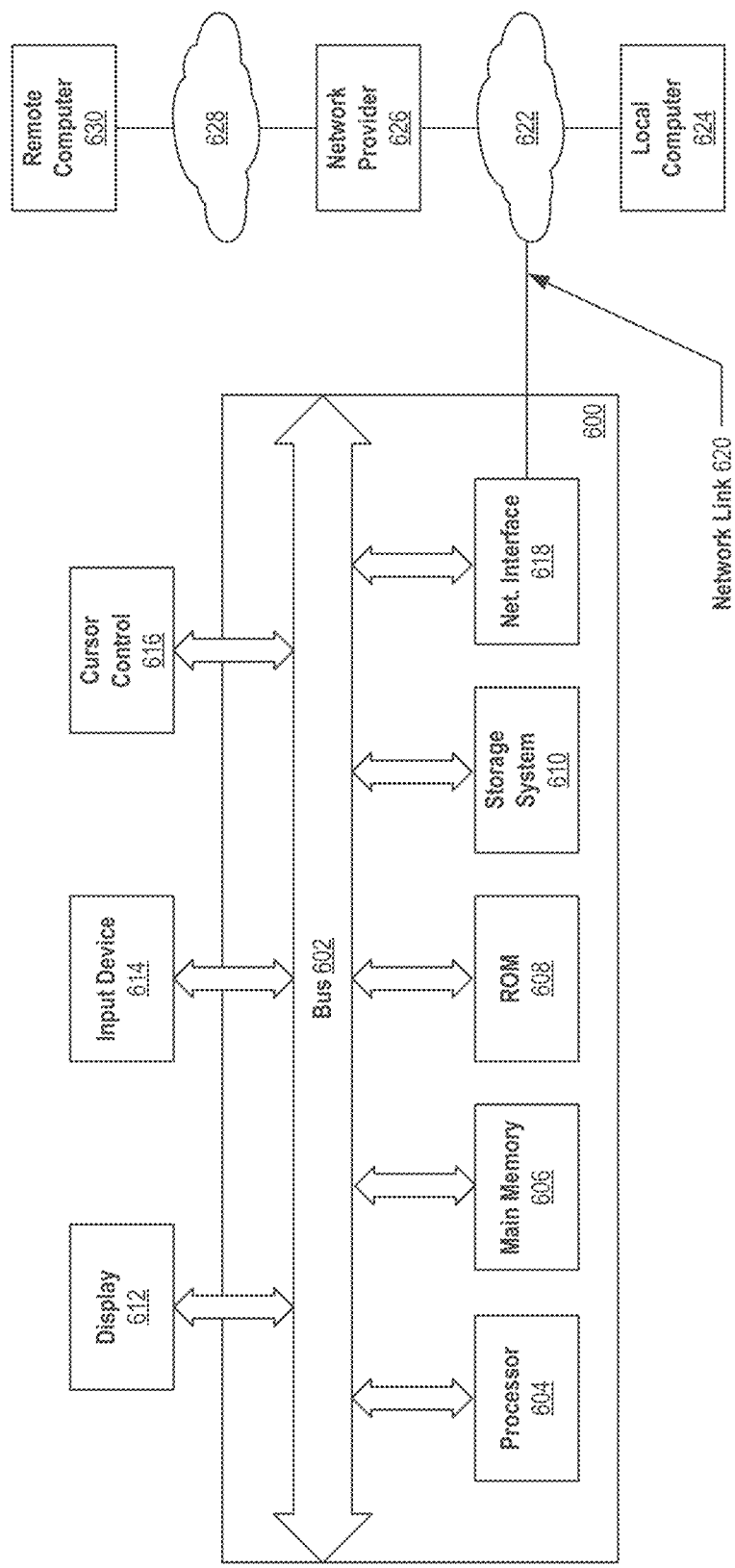
FIG. 6 is a block diagram of an example basic computing device that may be used in an implementation of the techniques.
Figure 7:
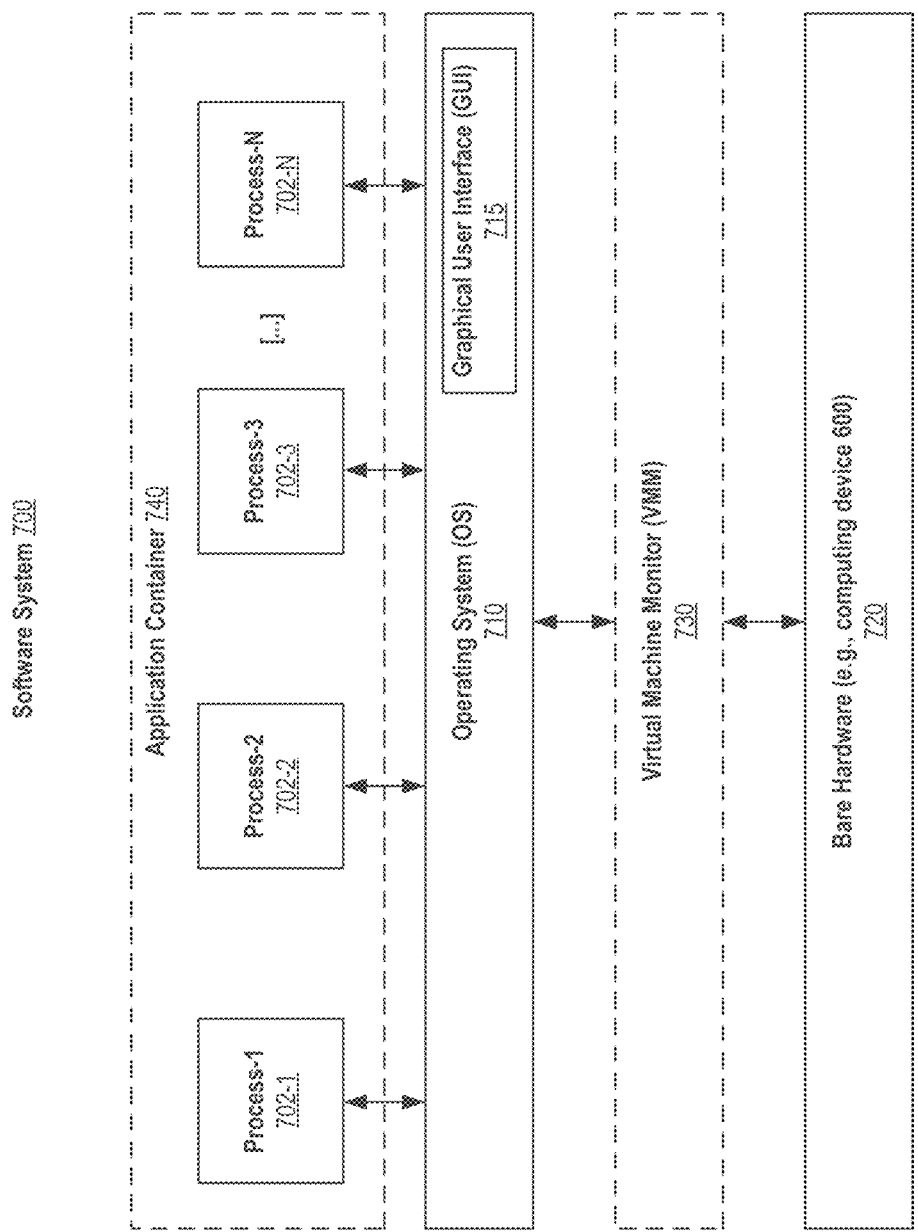
FIG. 7 is a block diagram of an example basic software system that may be employed for controlling the operation of the basic computing device of FIG. 6.

In some embodiments, the process 100 of FIGS. 1 and 2 may run on the system 500 of FIG. 5 and/or the hardware 600 of FIG. 6 and the software of FIG. 7. For example, the described functions of process 100 may be performed by one or more of systems 510-530. Each system 510-530 may run on a single computing device, multiple computing devices, in a distributed manner across a network, on one or more virtual machines, which themselves run on one or more computing devices. In some embodiments, systems 510-530 are distinct sets of processes running on distinct sets of computing devices. In other embodiments, systems 510-530 are intertwined or share processes or functions and/or run on the same computing devices. In some embodiments, storage 540 and 541 are communicatively coupled to systems 510-530 via a network 590 or other connection. Storage 540 and 541 may also be part of or integrated with one or more of systems 510-530.

As discussed herein, the process 100 may be subdivided into sub-processes or tasks thereof, which may run in parallel, in conjunction, together, with each other, or one subprocess or task may be a subprocess of another subprocess or task in hierarchical arrangement. Further, process 100 or subprocess thereof may run on the systems or hardware discussed herein.

Basic Computing Device

The techniques may be implemented by at least one computing device. If by more than one computing device, the techniques may be implemented in whole or in part using a combination of computing devices that are coupled together using a network, such as a packet data network. A computing device used in an implementation of the techniques may be hard-wired to perform some or all of the techniques, or may include digital electronic devices such as at least one application-specific integrated circuit (ASIC) or field programmable gate array (FPGA) that is persistently programmed to perform some or all of the techniques, or may include at least one general purpose hardware processor programmed to perform some or all of the techniques pursuant to program instructions in firmware, memory, other storage, or a combination. A computing device used in an implementation of the techniques may also combine custom hard-wired logic, ASICs, or FPGAs with custom programming to accomplish some or all of the techniques. A computing device used in an implementation of the techniques may be a server computing device, a workstation computing device, a personal computing device, a portable computing device, a handheld computing device, a mobile computing device or any other computing device that incorporates hard-wired or program logic to implement some or all the techniques.

FIG. 6 is a block diagram of an example basic computing device that may be used in an implementation of the techniques.

In the example of FIG. 6, computing device 600 and instructions for implementing some or all the techniques in hardware, software, or a combination of hardware and software, are represented schematically, for example as boxes and circles, at the same level of detail that is commonly used by persons of ordinary skill in the art to which this disclosure pertains for communicating about computer architecture and computing device implementations.

Computing device 600 includes an input/output (I/O) subsystem 602 which may include a bus or other communication mechanism for communicating information or instructions between the components of the computing device 600 over electronic signal paths. The I/O subsystem 602 may include an I/O controller, a memory controller and at least one I/O port. The electronic signal paths are represented schematically in the drawings, for example as lines, unidirectional arrows, or bidirectional arrows.

At least one hardware processor 604 is coupled to I/O subsystem 602 for processing information and instructions. Hardware processor 604 may include, for example, a general-purpose microprocessor or microcontroller or a special-purpose microprocessor such as an embedded system or a graphics processing unit (GPU) or a digital signal processor or ARM processor. Processor 604 may comprise an integrated arithmetic logic unit (ALU) or may be coupled to a separate ALU.

Computing device 600 includes one or more units of memory 606, such as a main memory, which is coupled to I/O subsystem 602 for electronically digitally storing data and instructions to be executed by processor 604. Memory 606 may include volatile memory such as various forms of random-access memory (RAM) or other dynamic storage device.

Memory 606 also may be used for storing temporary variables or other intermediate information during execution of instructions to be executed by processor 604. Such instructions, when stored in non-transitory storage media accessible to processor 604, can render computing device 600 into a special-purpose machine that is customized to perform the operations specified in the instructions.

Computing device 600 further includes non-volatile memory such as read only memory (ROM) 608 or other static storage device coupled to I/O subsystem 602 for storing information and instructions for processor 604. The ROM 608 may include various forms of programmable ROM (PROM) such as erasable PROM (EPROM) or electrically erasable PROM (EEPROM). A unit of persistent storage 610 may include various forms of non-volatile RAM (NVRAM), such as FLASH memory, or solid-state storage, magnetic disk or optical disk such as CD-ROM or DVD-ROM and may be coupled to I/O subsystem 602 for storing information and instructions. Storage 610 is an example of a non-transitory computer-readable medium that may be used to store instructions and data which when executed by the processor 604 cause performing computer-implemented methods to execute some or all the techniques.

The instructions in memory 606, ROM 608 or storage 610 may comprise one or more sets of instructions that are organized as modules, methods, objects, functions, routines, or calls. The instructions may be organized as one or more computer programs, operating system services or application programs including mobile apps. The instructions may comprise an operating system or system software; one or more libraries to support multimedia, programming or other functions; data protocol instructions or stacks to implement TCP/IP, HTTP or other communication protocols; file processing instructions to interpret and render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or NoSQL, an object store, a graph database, a flat file system or other data storage.

Computing device 600 may be coupled via I/O subsystem 602 to at least one output device 612. Output device 612 may be a digital computer display. Examples of a display that may be used include a touch screen display or a light-emitting diode (LED) display or a liquid crystal display (LCD) or an e-paper display. Computing device 600 may include other types of output devices 612, alternatively or in addition to a display device. Examples of other output devices 612 include printers, ticket printers, plotters, projectors, sound cards or video cards, speakers, buzzers or piezoelectric devices or other audible devices, lamps or LED or LCD indicators, haptic devices, actuators, or servos.

An input device 614 may be coupled to I/O subsystem 602 for communicating signals, data, command selections or gestures to processor 604. Examples of input devices 614 include touch screens, microphones, still and video digital cameras, alphanumeric and other keys, keypads, keyboards, graphics tablets, image scanners, joysticks, clocks, switches, buttons, dials, slides, or various types of sensors such as force sensors, motion sensors, heat sensors, accelerometers, gyroscopes, and inertial measurement unit (IMU) sensors or various types of transceivers such as wireless, such as cellular or Wi-Fi, radio frequency (RF) or infrared (IR) transceivers and Global Positioning System (GPS) transceivers.

Another type of input device is a control device 616, which may perform cursor control or other automated control functions such as navigation in a graphical interface on a display screen, alternatively or in addition to input functions. Control device 616 may be a touchpad, a mouse, a trackball, or cursor direction keys for communicating direction information and command selections to processor 604 and for controlling cursor movement on display 612. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 614 may include a combination of multiple different input devices, such as a video camera and a depth sensor.

Computing device 600 may comprise an internet of things (IoT) device or other computing appliance in which one or more of the output device 612, input device 614, and control device 616 are omitted. The input device 614 may comprise one or more cameras, motion detectors, thermometers, microphones, seismic detectors, other sensors or detectors, measurement devices or encoders and the output device 612 may comprise a special-purpose display such as a single-line LED or LCD display, one or more indicators, a display panel, a meter, a valve, a solenoid, an actuator, or a servo.

When computing device 600 is a mobile or portable computing device, input device 614 may comprise a global positioning system (GPS) receiver coupled to a GPS module that is capable of triangulating to a plurality of GPS satellites, determining and generating geo-location or position data such as latitude-longitude values for a geophysical location of the computing device 600. Output device 612 may include hardware, software, firmware and interfaces for generating position reporting packets, notifications, pulse or heartbeat signals, or other recurring data transmissions that specify a position of the computing device 600, alone or in combination with other application-specific data, directed toward host 624 or server 630.

Computing device 600 may implement some or all of the techniques using customized hard-wired logic, at least one ASIC or FPGA, firmware or program instructions or logic which when loaded and used or executed in combination with computing device 600 causes or programs computing device 600 to operate as a special-purpose machine.

The techniques performed by computing device 600 may be performed in response to processor 604 executing at least one sequence of at least one instruction contained in main memory 606. Such instructions may be read into main memory 606 from another storage medium, such as storage 610. Execution of the sequences of instructions contained in main memory 606 causes processor 604 to perform some or all the techniques. Hard-wired circuitry may be used in place of or in combination with software instructions.

The term "storage media" as used herein refers to any non-transitory computer-readable media that store data or instructions that cause a machine to operation in a specific fashion. Such storage media may comprise non-volatile media or volatile media. Non-volatile media includes, for example, optical or magnetic disks, such as storage 610. Volatile media includes dynamic memory, such as memory 606. Common forms of storage media include, for example, a hard disk, solid state drive, flash drive, magnetic data storage medium, any optical or physical data storage medium, memory chip or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 602. Transmission media can also take the form of acoustic or light waves, such as those generated during radio-wave and infra-red data communications.

Various forms of media may be involved in carrying at least one sequence of at least one instruction to processor 604 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computing device 600 can receive the data on the communication link and convert the data to be read by computing device 600. For instance, a receiver such as a radio frequency antenna or an infrared detector can receive the data carried in a wireless or optical signal and appropriate circuitry can provide the data to I/O subsystem 602 such as place the data on a bus. I/O subsystem 602 carries the data to memory 606, from which processor 604 retrieves and executes the instructions. The instructions received by memory 606 may optionally be stored on storage 610 either before or after execution by processor 604.

Computing device 600 also includes a communication interface 618 coupled to bus 602. Communication interface 618 provides a two-way data communication coupling to network link 620 that is directly or indirectly connected to at least one communication networks, such as a network 622 or a public or private cloud on the Internet. For example, communication interface 618 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 622 broadly represents a local area network (LAN), wide-area network (WAN), campus network, internetwork or any combination thereof. Communication interface 618 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 618 sends and receives electrical, electromagnetic, or optical signals over signal paths that carry digital data streams representing various types of information.

Network link 620 typically provides electrical, electromagnetic, or optical data communication directly or through at least one network to other data devices, using, for example, satellite, cellular, Wi-Fi, or BLUETOOTH technology. For example, network link 620 may provide a connection through a network 622 to a host computer 624.

Furthermore, network link 620 may provide a connection through network 622 or to other computing devices via internetworking devices and/or computers that are operated by an Internet Service Provider (ISP) 626. ISP 626 provides data communication services through a world-wide packet data communication network represented as internet 628. A server computer 630 may be coupled to internet 628. Server 630 broadly represents any computer, data center, virtual machine or virtual computing instance with or without a hypervisor, or computer executing a containerized program system such as DOCKER or KUBERNETES. Server 630 may represent an electronic digital service that is implemented using more than one computer or instance and that is accessed and used by transmitting web services requests, uniform resource locator (URL) strings with parameters in HTTP payloads, API calls, app services calls, or other service calls.

Computing device 600 and server 630 may form elements of a distributed computing system that includes other computers, a processing cluster, server farm or other organization of computers that cooperate to perform tasks or execute applications or services. Server 630 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to interpret or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 630 may comprise a web application server that hosts a presentation layer, application layer and data storage layer such as a relational database system using structured query language (SQL) or NoSQL, an object store, a graph database, a flat file system or other data storage.

Computing device 600 can send messages and receive data and instructions, including program code, through a network, network link 620 and communication interface 618. In the Internet example, server 630 might transmit a requested code for an application program through Internet 628, ISP 626, local network 622 and communication interface 618. The received code may be executed by processor 604 as it is received, or stored in storage 610, or other non-volatile storage for later execution.

Basic Software System

FIG. 7 is a block diagram of an example basic software system 700 that may be employed for controlling the operation of computing device 600 of FIG. 6. Software system 700 and its components, including their connections, relationships, and functions, is meant to be an example only, and not meant to limit implementations of the techniques. Other software systems suitable for implementing the techniques may have different components, including components with different connections, relationships, and functions.

Software system 700 is provided for directing the operation of computer system 600. Software system 700, which may be stored in system memory (RAM) 606 and on fixed storage (e.g., hard disk or flash memory) 610, includes a kernel or operating system (OS) 710.

OS 710 manages low-level aspects of computer operation, including managing execution of processes, represented as 702-1, 702-2, 702-3 ... 702-N, memory allocation, file input and output (I/O) and device I/O. One or more application programs may be "loaded" (e.g., transferred from fixed storage 610 into memory 606) for execution as one or more processes by the system 700. The applications or other software intended for use on computing device 600 may also be stored as a set of downloadable computer-executable instructions, for example, for downloading and installation from an Internet location (e.g., a Web server, an app store or other online service).

The execution of application program instructions may implement a process (e.g., 702-2) in the form of an instance of a computer program that is being executed and consisting of program code and its current activity. Depending on the operating system (OS), a process (e.g., 702-3) may be made up of multiple threads of execution that execute instructions concurrently. In this context, a computer program is a passive collection of instructions, while a process (e.g., 702-1) may be the actual execution of those instructions. Several processes (e.g., 702-1 and 702-2) may be associated with the same program; for example, opening several instances of the same program often means more than one process is being executed, or a program that initially launches as a single process may subsequently spawn (e.g., fork) additional processes.

OS 710 may implement multitasking to allow processes 702-1, 702-2, 702-3 ... 702-N to share processor 604. While each processor 604 or core of the processor executes a single task at a time, computing device 600 may be programmed to implement multitasking to allow each processor to switch between tasks that are being executed without having to wait for each task to finish. Switches may be performed when tasks perform input/output operations, when a task indicates that it can be switched, or on hardware interrupts. Timesharing may be implemented to allow fast response for interactive user applications by rapidly performing context switches to provide the appearance of concurrent execution of multiple processes simultaneously. For security and reliability, OS 710 may prevent direct communication between independent processes, providing strictly mediated and controlled inter-process communication functionality.

In some instances, processes 702-1, 702-2, 702-3 ... 702-N and the application programs they implement may execute within application container 740. Application containers generally are a mode of operation of OS 710 in which OS 710 allows the existence of multiple isolated user space instances to run on OS 710. Application container 740 is an example of one such instance. The instances themselves are sometimes alternatively referred to as zones, virtual private servers, partitions, virtual environments, virtual kernels, or jails. Application containers provide a mechanism whereby finite hardware computing resources such as CPU time and storage media space can be allocated among the instances.

Software system 700 includes a graphical user interface (GUI) 715, for receiving user commands and data in a graphical (e.g., "point-and-click" or "touch gesture") fashion. These inputs, in turn, may be acted upon by system 700 in accordance with instructions from operating system 710 or processes 702-1, 702-2, 702-3 ... 702-N. GUI 715 also serves to display the results of operation from OS 710 and processes 702-1, 702-2, 702-3 ... 702-N 702, whereupon the user may supply additional inputs or terminate the session (e.g., log off).

OS 710 can execute directly on bare hardware 720 (e.g., processor 604) of computing device 600. Alternatively, a hypervisor or virtual machine monitor (VMM) 730 may be interposed between bare hardware 720 and OS 710. In this configuration, VMM 730 acts as a software "cushion" or virtualization layer between OS 710 and bare hardware 720 of computing device 600.

VMM 730 instantiates and runs one or more virtual machine instances ("guest machines"). Each guest machine comprises a "guest" operating system, such as OS 710, and one or more applications, such as applications 702, designed to execute on the guest operating system. VMM 730 presents the guest operating systems with a virtual operating platform and manages the execution of the guest operating systems.

In some instances, VMM 730 may allow a guest operating system to run as if it is running on bare hardware 720 of computing device 600 directly. In these instances, the same version of the guest operating system configured to execute on the bare hardware 720 directly may also execute on VMM 730 without modification or reconfiguration. In other words, VMM 730 may provide full hardware and CPU virtualization to a guest operating system in some instances.

In other instances, a guest operating system may be specially designed or configured to execute on VMM 730. In these instances, the guest operating system is "aware" that it executes on a virtual machine monitor. In other words, VMM 730 may provide para-virtualization to a guest operating system in some instances.

Cloud Computing

The techniques may be implemented in a "cloud computing" environment. The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (e.g., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (e.g., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

Other Aspects of the Disclosure

Unless the context clearly indicates otherwise, the term "or" is used in the foregoing specification and in the appended claims in its inclusive sense (and not in its exclusive sense) so that when used, for example, to connect a list of elements, the term "or" means one, some, or all of the elements in the list.

Unless the context clearly indicates otherwise, the terms "comprising," "including," "having," "based on," "encompassing," and the like, are used in the foregoing specification and in the appended claims in an open-ended fashion, and do not exclude additional elements, features, acts, or operations.

Unless the context clearly indicates otherwise, conjunctive language such as the phrase "at least one of X, Y, and Z," is to be understood to convey that an item, term, etc. may be either X, Y, or Z, or a combination thereof. Thus, such conjunctive language is not intended to require by default implication that at least one of X, at least one of Y and at least one of Z to each be present.

Unless the context clearly indicates otherwise, as used in the foregoing detailed description and in the appended claims, the singular forms "a," "an," and "the" are intended to include the plural forms as well.

Unless the context clearly indicates otherwise, in the foregoing detailed description and in the appended claims, although the terms first, second, etc. are, in some instances, used herein to describe various elements, these elements should not be limited by these terms. These terms are only used to distinguish one element from another. For example, a first computing device could be termed a second computing device, and, similarly, a second computing device could be termed a first computing device. The first computing device and the second computing device are both computing devices, but they are not the same computing device.

In the foregoing specification, the techniques have been described with reference to numerous specific details that may vary from implementation to implementation. The specification and drawings are, accordingly, to be regarded in an illustrative rather than a restrictive sense.

The invention claimed is:

1. A method comprising:
non-parametrically estimating a discrete mixing distribution of sets of mixture component weights to learn a set of mixture weights;
determining, using the set of mixture weights and features of a particular future broadcast event, a viewership probability for the particular future broadcast event;
determining a regional population viewer cap for a particular region;
determining, based on the regional population viewer cap for the particular region and the viewership probability, an estimate of a number of persons in the particular region that will watch the particular future broadcast event;
wherein the method is performed by one or more computing devices.

2. The method of claim 1, wherein:
  the regional population viewer cap is a seasonally adjusted regional population viewer cap for the particular region; and
  determining the estimate of the number of persons in the particular region comprises multiplying the viewership probability for the particular future broadcast event by the seasonally adjusted regional population viewer cap for the particular region.

3. The method of claim 1, wherein:
  the viewership probability is a seasonally adjusted viewership probability for the particular future broadcast event;
  determining the estimate of the number of persons in the particular region comprises multiplying the seasonally adjusted viewership probability for the particular future broadcast event by the regional population viewer cap for the particular region.

4. The method of claim 1, wherein the features of the particular future broadcast event comprising at least one of the following:
  a numerical value indicating how far into a season the particular future broadcast event takes place,
  a numerical value indicating a performance of a better performing team participating in the particular future broadcast event among all teams in a sports league,
  a numerical value indicating a performance of a worse performance team participating in the particular future broadcast event among all teams in a sports league,
  a numerical value indicating whether the particular future broadcast event occurs during a weekend in the particular region,
  a numerical value indicating a physical distance between a physical location of the particular future broadcast event and the particular region,
  a numerical value indicating a time of day in the particular region when the particular future broadcast event is broadcast in the particular region,
  a numerical value representing an extent of competition for viewers between a first sports league associated with the particular future broadcast event and a second sports league for which a game or match is being broadcast in the particular region at a same time that the particular future broadcast event is broadcast in the particular region,
  a numerical value representing an extent of competition for viewers between the particular future broadcast event and another event associated with a same sports league as the particular future broadcast event being broadcast in the particular region at a same time that the particular broadcast even is broadcast in the particular region,
  a numerical value representing how often games from a sports league associated with the particular future broadcast event are broadcast in the particular region,
  a numerical value representing a popularity of a most popular team participating the particular future broadcast event, or
  a numerical value representing how uncertain is an outcome of the particular future broadcast event.

5. The method of claim 1, wherein the particular region corresponds to a county, city, zip code area, or a phone area code.

6. The method of claim 1, wherein the particular region corresponds to a radial distance from a geographic location.

7. The method of claim 1, wherein the particular region corresponds to a radial distance from a physical store or retail location.

8. The method of claim 1, wherein the particular future broadcast event is a televised sporting event.

9. The method of claim 1, wherein the particular future broadcast event is broadcast over the Internet.

10. The method of claim 1, further comprising:
  receiving demand data reflecting consumer demand for a good or service over time;
  determining, from the demand data, derivative demand for the good or service over the time;
  determining the sets of mixture component weights reflecting relationships between the derivative demand for the good or service over the time and broadcast media events that were broadcast during the time.

11. The method of claim 1, further comprising:
  receiving viewership data pertaining to a plurality of broadcast events over time;
  determining, from the viewership data, derivative viewership data over the time;
  determining the sets of mixture component weights reflecting relationships between the derivative viewership data over the time and broadcast media events that were broadcast during the time.

12. One or more non-transitory storage media storing instructions which, when executed by one or more processors, cause:
  non-parametrically estimating a discrete mixing distribution of sets of mixture component weights to learn a set of mixture weights;
  determining, using the set of mixture weights and features of a particular future broadcast event, a viewership probability for the particular future broadcast event;
  determining a regional population viewer cap for a particular region;
  determining, based on the regional population viewer cap for the particular region and the viewership probability, an estimate of a number of persons in the particular region that will watch the particular future broadcast event;
  wherein the method is performed by one or more computing devices.

13. The one or more non-transitory storage media of claim 12, wherein:
  the regional population viewer cap is a seasonally adjusted regional population viewer cap for the particular region; and
  determining the estimate of the number of persons in the particular region comprises multiplying the viewership probability for the particular future broadcast event by the seasonally adjusted regional population viewer cap for the particular region.

14. The one or more non-transitory storage media of claim 12, wherein:
  the viewership probability is a seasonally adjusted viewership probability for the particular future broadcast event;
  determining the estimate of the number of persons in the particular region comprises multiplying the seasonally adjusted viewership probability for the particular future broadcast event by the regional population viewer cap for the particular region.

15. The one or more non-transitory storage media of claim 12, wherein the features of the particular future broadcast event comprising at least one of the following:

a numerical value indicating how far into a season the particular future broadcast event takes place, a numerical value indicating a performance of a better performing team participating in the particular future broadcast event among all teams in a sports league, a numerical value indicating a performance of a worse performance team participating in the particular future broadcast event among all teams in a sports league, a numerical value indicating whether the particular future broadcast event occurs during a weekend in the particular region, a numerical value indicating a physical distance between a physical location of the particular future broadcast event and the particular region, a numerical value indicating a time of day in the particular region when the particular future broadcast event is broadcast in the particular region, a numerical value representing an extent of competition for viewers between a first sports league associated with the particular future broadcast event and a second sports league for which a game or match is being broadcast in the particular region at a same time that the particular future broadcast event is broadcast in the particular region, a numerical value representing an extent of competition for viewers between the particular future broadcast event and another event associated with a same sports league as the particular future broadcast event being broadcast in the particular region at a same time that the particular broadcast even is broadcast in the particular region, a numerical value representing how often games from a sports league associated with the particular future broadcast event are broadcast in the particular region, a numerical value representing a popularity of a most popular team participating the particular future broadcast event, or a numerical value representing how uncertain is an outcome of the particular future broadcast event.

16. The one or more non-transitory storage media of claim 12, wherein the particular region corresponds to a county, city, zip code area, or a phone area code.

17. The one or more non-transitory storage media of claim 12, wherein the particular region corresponds to a radial distance from a geographic location.

18. The one or more non-transitory storage media of claim 12, wherein the particular future broadcast event is a televised sporting event.

19. The one or more non-transitory storage media of claim 12, wherein the instructions, when executed by the one or more processors, further cause:

receiving demand data reflecting consumer demand for a good or service over time;

determining, from the demand data, derivative demand for the good or service over the time;

determining the sets of mixture component weights reflecting relationships between the derivative demand for the good or service over the time and broadcast media events that were broadcast during the time.

20. The one or more non-transitory storage media of claim 12, wherein the instructions, when executed by the one or more processors, further cause:

receiving viewership data pertaining to a plurality of broadcast events over time;

determining, from the viewership data, derivative viewership data over the time;

determining the sets of mixture component weights reflecting relationships between the derivative viewership data over the time and broadcast media events that were broadcast during the time.

* * * * *